Nov. 7, 1944.   G. BARRETT   2,361,920
LOCKING MECHANISM FOR CONTROL GEARS
Filed June 9, 1943   4 Sheets-Sheet 1
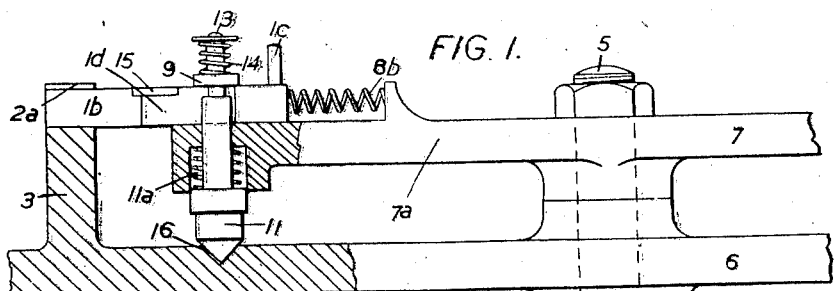
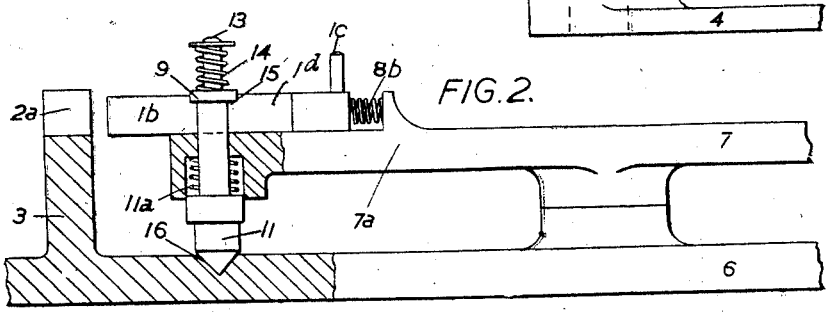
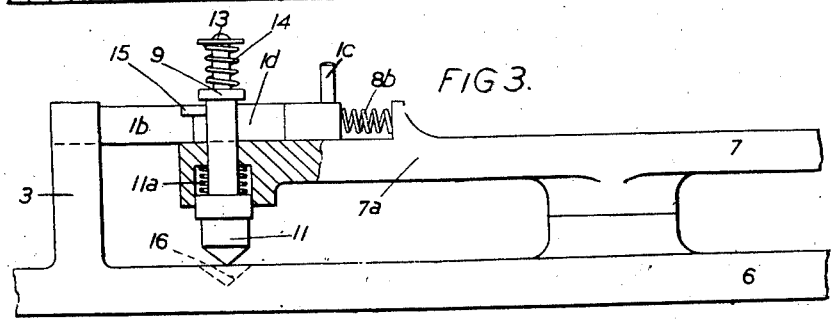
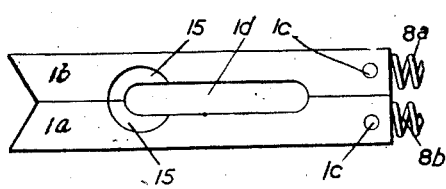
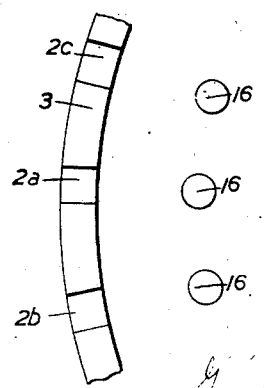
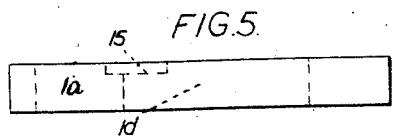
Inventor,
Guy Barrett,
By Frank S. Appleman,
Attorney.

Nov. 7, 1944.          G. BARRETT          2,361,920
LOCKING MECHANISM FOR CONTROL GEARS
Filed June 9, 1943          4 Sheets-Sheet 2
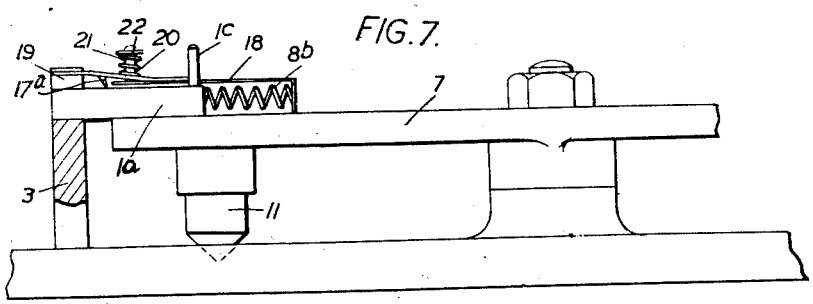
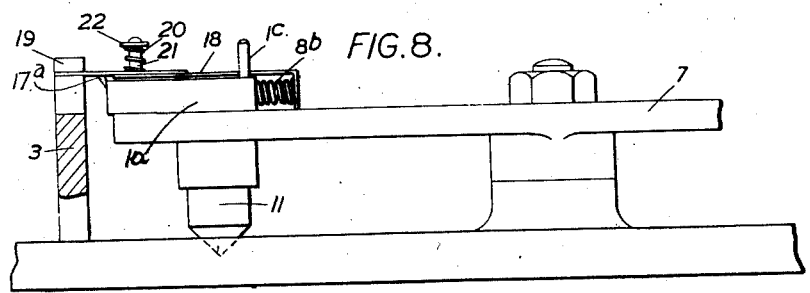
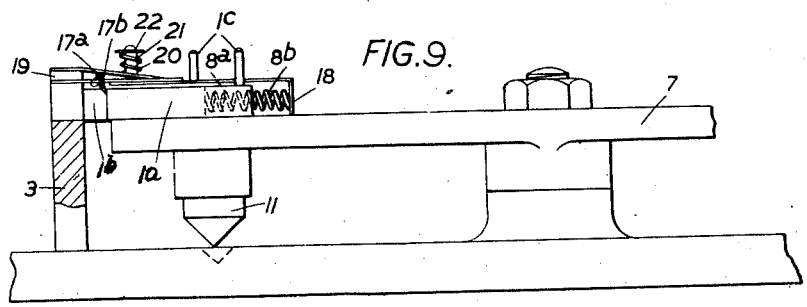
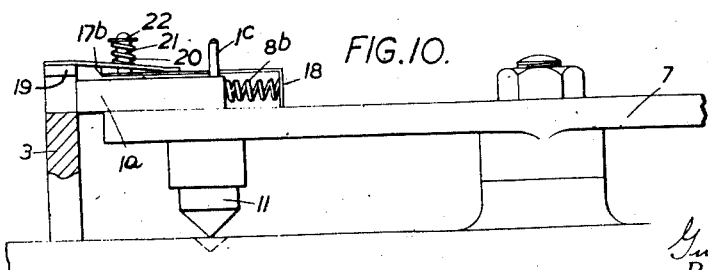

Nov. 7, 1944.      G. BARRETT      2,361,920
LOCKING MECHANISM FOR CONTROL GEARS
Filed June 9, 1943      4 Sheets-Sheet 3

Inventor,
Guy Barrett,
By
Frank S. Ashleman,
Attorney.

Nov. 7, 1944.    G. BARRETT    2,361,920
LOCKING MECHANISM FOR CONTROL GEARS
Filed June 9, 1943    4 Sheets-Sheet 4

Inventor,
Guy Barrett,
By
Frank L. Appleman,
Attorney.

Patented Nov. 7, 1944

2,361,920

UNITED STATES PATENT OFFICE 2,361,920

LOCKING MECHANISM FOR CONTROL GEARS

Guy Barrett, Market Harborough, England, assignor to Wycliffe Foundry & Engineering Co. Limited, Lutterworth, England, a company of Great Britain Application June 9, 1943, Serial No. 490,224
In Great Britain June 15, 1942

11 Claims. (Cl. 74—565)

In connection with various mechanisms, for example variable transmission or speed mechanisms, it is frequently necessary or desirable to effect relative movement of particular parts through definite distances, or series of definite distances, i. e. from one position to another predetermined position or positions, and upon termination of the movement or each movement to lock the parts thus moved against further movement until the operations are to be repeated. When, as is often the case, the desired extent of a relative movement or each movement is short and the speed of the movement is quick, difficulty arises in securing reliability of operation combined with sufficiently robust but light component parts.

In this connection the present invention is intended for application mainly to mechanisms of the type which include a handle or lever and in which it is required to lock the handle or lever after each movement. The invention is thus advantageously applicable to mechanical controlling mechanism in which the handle or lever serves, through intermediate means such as a spindle and an auxiliary lever, a fork, or cam or equivalent means, to effect required movement of a movable part or parts, for instance a pinion in relation to a set of gears, as in variable speed gearing, or forms part of an electrical controlling mechanism as, for instance, in electric motor starting gear in which the handle or lever is movable in relation to a series of contacts, but is not to be regarded as limited in this respect as it may be applied to other mechanisms in which similar or equivalent conditions appertain.

In mechanisms of the type aforesaid it is necessary or desirable to limit the movement of the handle or lever to a predetermined extent at each operation, and for this purpose a spring loaded catch is usually associated with the handle or lever for engagement with one or another or others of spaced holes, countersinks, or notches (hereinafter for convenience referred to as the notches) in an associated fixed part, such as a quadrant or the like on a gear box. The catch holds the handle or lever in the required position and is disengaged from a notch against the spring action by forcible operation of the handle or lever, or by other appropriate operation of the catch.

A disadvantage with existing arrangements is that it is possible by reason of careless or too quick manipulation of the handle or lever to slip a notch or notches so that instead of required changes being effected gradually and one at a time they are effected irregularly or abruptly and more than one at a time or not even in complete steps with the possibility of detrimentally affecting the controlling mechanism or/and the machine, vehicle or the like to which power is transmitted through the said mechanism.

We are aware that it is also known to provide in connection with steam engines, e. g. locomotives, and for marine propulsion, notching or linking up and reversing gear including a lever fitted with a spring-loaded catch, and a notched quadrant with which the catch is engaged, or equivalents thereof in many forms and sizes. While such gear is reliable when made with relatively heavy parts, and if those parts are operated slowly, it is not so effective when the lever has to be moved quickly through short distances because, to enable the catch to engage in a notch as it comes into register therewith, and to lock the lever in relation to the quadrant, time must be allowed for the catch actually to enter the notch deep enough to present a surface of contact between the catch and the side of the notch adequate to enable the metal to stand up to the repeated shock of the sudden arrest of the movement. This requires either a relatively slow rate of movement at the end of the desired relative movement of the parts, or a catch that is a slack fit in the notch, and in any case relatively heavy parts, all of which alternatives are open to objections.

It would of course be possible to bevel the end of the catch so that as it over-ran the first edge of the notch to be engaged it could immediately begin to enter that notch and thus, by the time it had passed across the full width of the notch, the catch would be entered therein to at least the depth of the bevel on its end, but this would introduce a fresh objection in that the arrangement would then be effective for locking in one direction only.

The invention therefore comprises an improvement the object of which is to overcome objections such as those aforesaid, as will be hereinafter set forth.

Accordingly the invention consists of means for the purpose described which include a sectional catch or bolt and a plurality of complementary formations, such as holes or notches (hereinafter referred to as the notches) associated respectively with the relatively movable parts, the sections of the catch or bolt being controllable suchwise as to be capable of operating successively to effect locking engagement with one or the other or another of the notches.

The notches are pitched to correspond with the distance, or series of distances, through which the relative movement is to be effected, and the sections of the catch or bolt are adapted to operate successively suchwise that they enter a notch one after the other or others whereby the first to enter the notch arrests the said movement whereafter the other or others follow to complete the locking action, thereby preventing further movement, backwards or forwards.

Having described the invention in general terms, particular illustrative embodiments will now be described as applied to a gear box of the type described in the specification of application for British Letters Patent No. 529,506 and with reference to the accompanying drawings, wherein, Figure 1 is a sectional side elevation of the upper part of the box with one form of sectional bolt mechanism in the locking position.

Figure 2 is a similar view but with the sectional bolt withdrawn.

Figure 3 is similar to Figure 2 but with the bolt partially advanced preparatory to engagement with a notch.

Figure 4 is a plan, and

Figure 5 is a side elevation of the bolt per se.

Figure 6 is a plan view of part of a quadrant hereinafter described.

Figures 7 to 10 are side elevations partly in section showing respectively a modified embodiment of the invention in different positions.

Figures 4 and 5 are drawn to a larger scale than Figures 1 to 3.

Figures 15 to 17 are drawn to a larger scale than Figures 13 and 14.

Figure 11:
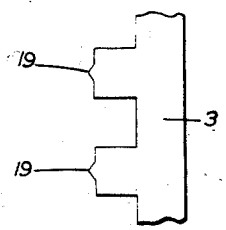
Figure 11 is a fragmentary elevation.
Figure 12:
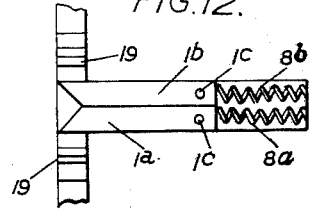
Figure 12 is a fragmentary plan of details hereinafter described.

Like parts are designated by the same reference characters except as regards the detents shown in Figures 7 to 10 and Figures 13 and 14.

Referring to Figures 1 to 3, for the changing from one speed to another in a gear box of this type an internal pinion (not shown) is moved from one predetermined position to another in relation to a set of obliquely disposed gears (not shown) by means of an internal lever 4 and it is necessary to hold the pinion rigidly in each such predetermined position. These changes of position of the pinion are effected by the rotation of a spindle 5 to which the internal lever is rigidly attached. The spindle 5 extends through the cover 6 of the gear box and at its other end has rigidly attached to it an operating handle 7. The problem resolves itself into the control of the movement of the handle, and in accordance with the invention, this handle is furnished with a sectional bolt.

Referring to Figures 1 to 4, according to one particular illustrative embodiment of the invention this bolt, which is divided longitudinally and vertically into two sections 1a, 1b formed with recesses 15, is slidably mounted on an arm 7a of the handle, and the sections are loaded by springs 8a, 8b which normally project them from the handle as shown in Figure 1.

Mounted rigidly on the cover of the gear box, in such a position that it lies conformably with the arc of a circle the centre of which is coincident with the spindle 5 of the handle, is a quadrant 3 formed with a series of notches 2a, 2b, 2c with which the bolt is brought into register respectively in consequence of step-by-step movement of the handle, in one direction or the other, and which the sections enter, under the spring action, as described later herein, thereby locking the handle in relation to the quadrant, and with it the pinion in relation to the gears in the box.

A plunger 11 housed in the handle 7 and loaded by a spring 11a is fitted with a stop 9 which is free to slide axially on an extension 13 of the plunger, and, by reason of gravity, or the pressure of a spring 14, bears on the sections of the bolt, as shown in Figure 1, when the latter are projected, and seats in the recesses 15 as shown in Figure 2, when the sections are withdrawn.

The plunger 11 is associated with a series of cavities, e. g. countersinks 16, formed in the cover 6 of the gear box and pitched to correspond with the pitch of the notches 2a, 2c in the quadrant 3. The sections 1a, 1b are recessed so that when they are juxtaposed a slot 1d, Figure 4, is formed in which the stem of the plunger is accommodated.

Either manually by means of pins 1c fixed in the sections, or by any suitable mechanical device, as for instance a lever or levers and a pull or push rod or rods, as hereinafter described, the sections of the bolt are withdrawn completely from the notch in which it is initially located. It should be noted that the plunger 11 retains the handle in its initial position during this operation by reason of engagement with a corresponding one of the cavities 16.

When the sections 1a, 1b are fully withdrawn the stop 9 registers with the recesses 15 and enters the same, so retaining the sections in the retracted position.

The handle 7 can then be moved so as to bring the sections into register with the next notch but as soon as the sections pass out of register with the initial notch the stop 9 is removed from the recesses 15, as shown in Figure 3, by the stem of the plunger, owing to the plunger itself being automatically forced from the corresponding cavity the side of which acts as a cam in this connection. The said sections are thereby released and under the pressure exerted by the springs 8a, 8b, bear against the inside of the quadrant, as shown in Figure 3. The continued movement of the handle brings the sections successively into register with the next notch, which they enter under the influence of the springs 8a, 8b, thereby locking the handle against further movement in either direction in relation to the quadrant 3.

This series of operations is repeated for each successive change of position of the handle.

Although in this embodiment of the invention the retention of the sectional bolt in the withdrawn position and release thereof is effected by means of the stop, the recesses and the spring controlled plunger, it will be realised that other means could be adopted. For example, as shown in Figures 7 to 10, detents 17a, 17b are associated with the sections 1a, 1b suchwise as to rest thereon when they are projected, as shown in Figure 7, and to move into engagement with the sections when the latter are retracted, as shown in Figure 8, thereby retaining them in that position, and cam formations 19 are provided on the quadrant 3, or on an equivalent fixed part, for successively tripping the detents and releasing the sections upon movement of the handle 7 between adjacent notches. As the handle is moved the detents 17a, 17b successively ride over the cam formation 19 which lifts them one after the other, as shown in Figures 9 and 10, thereby releasing the sections so that they perform the desired sequence of operations. It will be appreciated that in this arrangement the detents replace the stop 9 and the cam formations 19 function instead of the plunger. The detents are resilient and attached to the top of a cover 18 which houses the sections 1a, 1b and the associated springs 8a, 8b, and is secured on the handle. The detents are preferably also loaded by a compression spring 20 located on a pin 21 between the cover 18 and a washer 22 so that they are lifted against and drop under the action of the spring.

In each of the embodiments aforesaid the retraction of the sections is effected manually by means of the pins 1c fixed in the sections, but it can advantageously be effected by any other suitable means, as for instance by pull or push rods and a grip attached to the handle.

Figure 13:
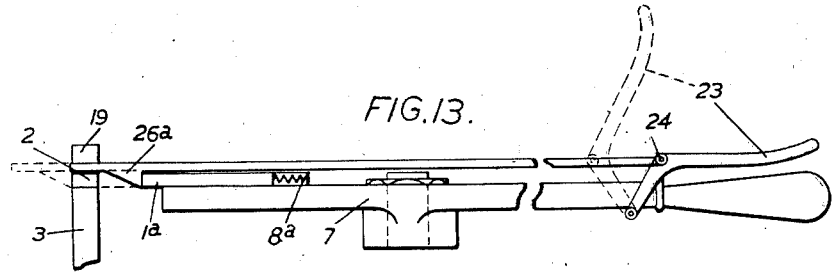
Figure 13 is a sectional side elevation.
Figure 14:
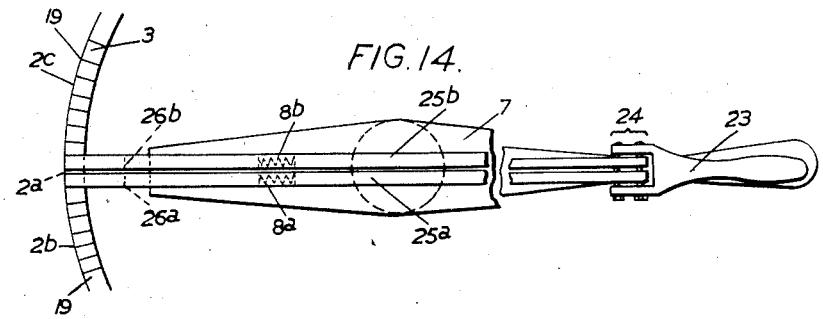
Figure 14 is a plan of a further example of the invention.
Figure 15:
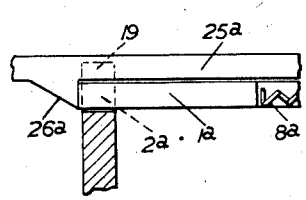
Figures 15 to 17 are sectional fragmentary views of one section of the bolt and an associated detent in different positions.
Figure 16:
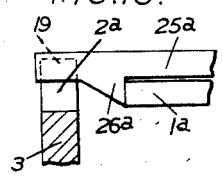
Figure 17:
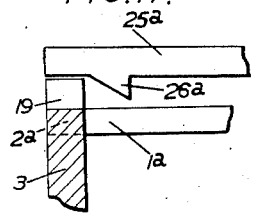
Figure 18:
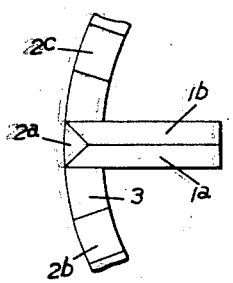
Figures 18 to 24 are fragmentary plan views of the sectional bolt and an associated quadrant showing respectively various stages in the operation of the bolt.

In one such arrangement, shown in Figures 13 and 14, a grip 23 is pivoted on the handle 7 in pivotal connection 24 with rods 25a, 25b on which detents 26a, 26b are provided suchwise that, in the normal position of the grip 23, shown by dotted lines in Figure 13, the detents as more clearly represented in Figure 15 are respectively positioned beyond the ends of the sections 1a, 1b of the bolt and the rods extend over the quadrant 3, or an adjacent part, on which there are cam formations 19, whereby when, as shown by full lines, the grip is operated the rods 25a, 25b, and with them the detents, are moved lengthwise to enable the detents to retract the sections against the action of the springs 8a, 8b, as represented in Figure 16. When the handle is moved laterally to carry the sections out of register with the initial notch 2a and towards either the notch 2b or 2c, the portions of the rods which still extend over the quadrant come into contact with the appropriate cam 19 on the quadrant, or adjacent part, so that the detents are tripped, as represented in Figure 17, thereby releasing the sections as previously described, so that they bear on the inside of the quadrant.

By gravity, spring pressure, or other suitable means, the rods, and with them the detents, are urged towards the sections of the bolt so that on return of the grip to the normal position (dotted lines in Figure 13) after release of the sections the detents automatically move into position (Figure 15) ready to retract the sections when the grip is next operated.

Figure 19:
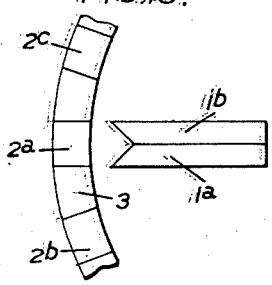
Figure 20:
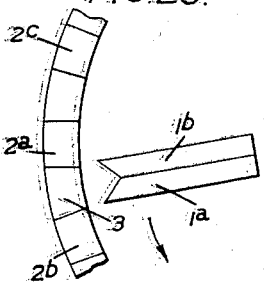
Figure 21:
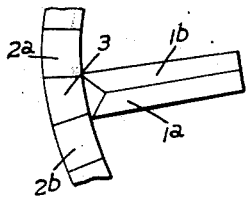
Figure 22:
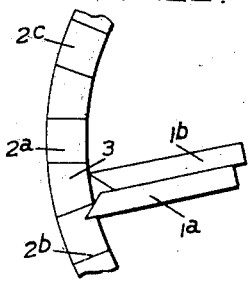
Figure 23:
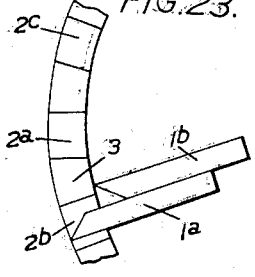
Figure 24:
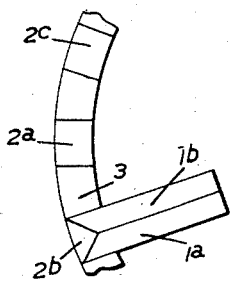

In the herein described particular illustrative embodiments of the invention the sequence of operations, described with reference to Figures 18 to 24, is as follows:

The sectional bolt, which is divided longitudinally in a vertical plane into two parts 1a, 1b, is fully shot into one of the notches, e. g. 2a (Figure 18), thereby locking the handle. To enable the handle to be moved to another position the sections are retracted so as to withdraw them clear of the notch (Figure 19). Upon movement of the handle one way or the other the sections are then moved (e. g. in the direction of the arrow, Figure 20) out of register with the said notch and as each section passes out of register with the notch it is retained by the stop or the associated detent until released, as hereinbefore described, whereupon it bears against the inner face of the quadrant 3 (Figure 21) while the lateral movement of the catch or bolt in relation to the quadrant continues towards the next notch, e. g. 2b. When the first section, e. g., 1a, to reach the next notch completely over-runs the near edge of this notch it is projected to the full extent of its permitted entry (Figure 23). This is practicable because, as aforesaid, the said section is materially narrower than the notch and therefore time can be provided for it fully to enter the notch in the interval that elapses between its complete over-running of the first edge of the notch and its coming into contact with the opposite side of that notch, thereby arresting the movement of the handle. The arrest of the movement allows the other section to enter the notch behind the first section (Figure 24) thus completing the locking of the mechanism against further movement, forwards or backwards, until a new cycle of operations as above described is commenced.

While the ends of the sections may be made square, they are preferably oppositely bevelled or mitred as shown so that the adjacent ends of the sections form a V, and the face of the section leading in any lateral movement in relation to the notches is longer than the trailing face of that section. The advantage of this formation is that when, according to the direction of movement of the handle, the leading section, e. g. 1a, reaches the next notch, instead of continuing to bear on the face of the quadrant until it is practically in register with this notch it commences to enter that notch (Figure 22) as soon as its leading face over-runs the edge of the notch. It is therefore already entered to the full depth of its bevel or mitre by the time its trailing face over-runs the edge of the notch and the period of time necessary for its further projection into the notch, if indeed any is required, is correspondingly reduced and the possible speed of operation of interlocking the parts is correspondingly increased.

It will be understood that in all cases the permitted depth of entry of the sections into the notches must be sufficient to provide sufficient bearing surface to withstand the repeated shocks of the sudden arrest of the movement.

Figure 25:
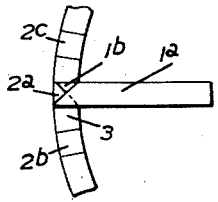
Figure 25 is a fragmentary plan of a modified form of the bolt and the quadrant.
Figure 26:
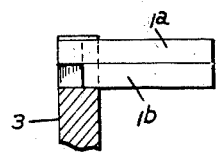
Figure 26 is a sectional elevation of the same parts.

In the foregoing explanation it is assumed that the bolt is divided through a longitudinal vertical plane as shown, but in some cases, as for instance when the bolt is of dimensions small in relation to the load it arrests and therefore in regard to the momentum it has to absorb, it may be desirable to divide the bolt longitudinally and horizontally as shown in Figures 25 and 26. In such case the ends of the sections 1a, 1b should be bevelled or mitred so as to ensure that the bolt will be entered into the notches 2a—2c sufficiently to provide a sufficiency of contact between the bolt and the sides of the notches to withstand wear due to the repeated arrest of the movement, but apart from the clearances imposed by the requirements of a working fit, the sections may be of substantially the same width as a notch. The sections will also be arranged so that their respective longer sides are adjacent to opposite sides of a notch, as shown in Figure 25, and, therefore, in any lateral movement of the bolt in relation to the notches one or other of the sections will have its longer face leading and will therefore begin to enter a notch as soon as its longer face begins to over-run the edge of the notch as hereinbefore described, and will be sufficiently entered into the notch to absorb the shock of the arrest of the movement. The other bolt section will then enter the notch as before described to complete the locking action.

The division of the bolt into sections through a vertical plane is preferable to division through a horizontal plane as aforesaid because the former provides a period during which the leading section is out of contact with the quadrant and therefore can be more easily projected into a notch, and facilitates quicker changes from one notch to the next with increased surety of effective interlocking of the parts at the end of their desired relative movement.

Alternatively, it would be possible to divide the bolt horizontally into sections respectively narrower than a notch, and to mount the sections in guides suchwise that one is offset in relation to the other so that the overall width of the bolt is substantially equal to the width of a notch. In this way, since each section of the bolt would be narrower than the notch which it has to enter, the same certainty of action, as is the case with the vertically divided bolt, would be obtained.

Although the sectional bolt has been described as consisting of two sections, it will be realised that it may equally well be divided into a greater number all arranged to be actuated successively as above described.

From the foregoing description it will be appreciated that the invention comprises as its essential feature means for interlocking relatively movable parts of a mechanism after their relative movement, including a sectional bolt the respective sections of which operate successively in such manner that one enters a notch first and arrests the said relative movement, and the succeeding section or sections enters or enter the notch after the first, and completes or complete the locking of the mechanism against further relative movement forwards or backwards, e. g. at any one of a series of points successively, without fear of over-running.

What I claim then is:

1. A locking mechanism comprising, in combination, a bolt which is divided longitudinally into a plurality of sections and formed with recesses, a pivoted handle upon which the bolt is slidably mounted, springs adapted normally to project the sections from said handle, a quadrant formed with a series of notches, said quadrant being arranged concentrically with respect to the pivot of the handle so as to enable the bolt to be brought into register with the notches respectively in consequence of step-by-step movement of the handle, means for withdrawing the sections from the notches against the spring action, a plunger housed in said handle, a spring for loading said plunger, a stop which is fitted on the latter and free to slide thereon so as to seat in the aforesaid recesses when the sections are withdrawn from a notch, a part on which the handle is mounted, said part being formed with cavities, pitched to correspond with the pitch of the notches for engagement by the plunger for the purpose of holding the handle prior to movement when the sections are withdrawn, and tripping the stop when the handle is moved so that in the action of changing from one notch to another the sections successively enter the notch to be engaged in order to lock the handle from movement in either direction.

2. A locking mechanism comprising, in combination, a bolt which is divided longitudinally into a plurality of sections and formed with recesses, a pivoted handle upon which the bolt is slidably mounted, springs adapted normally to project the sections from said handle, a quadrant formed with a series of notches, said quadrant being arranged concentrically with respect to the pivot of the handle so as to enable the bolt to be brought into register with the notches respectively in consequence of step-by-step movement of the handle, means for withdrawing the sections from the notches against the spring action, detents associated with the sections suchwise as to move into engagement with said sections when the latter are retracted, a plunger housed in said handle, a spring for loading said plunger, a part formed with cavities which are pitched to correspond with the pitch of the notches and adapted for engagement by the plunger for the purpose of holding the handle prior to movement when the sections are withdrawn, and cam means for successively tripping the detents and releasing the sections upon movement of the handle, whereby in the action of changing from one notch to another the sections successively enter the notch to be engaged in order to lock the handle from movement in either direction.

3. A locking mechanism comprising, in combination, a bolt which is divided longitudinally into a plurality of sections and formed with recesses, a pivoted handle upon which the bolt is slidably mounted, springs adapted normally to project the sections from said handle, a quadrant formed with a series of notches, said quadrant being arranged concentrically with respect to the pivot of the handle so as to enable the bolt to be brought into register with the notches respectively in consequence of step-by-step movement of the handle, a grip which is pivoted on the handle, rods in pivotal connection with said grip, detents provided on said rods suchwise that in the normal position of the grip the detents are respectively positioned beyond the ends of the sections and the rods extend over the quadrant, and cam means for action upon the rods whereby when the grip is operated, the rods are moved lengthwise to enable the detents to retract the sections against the spring action, the construction being such, moreover, that when the handle is moved laterally to carry the sections from one notch to another the rods will be acted upon by the cam means suchwise as to trip the detents and release the sections, thereby enabling the latter successively to enter the notch to be engaged, for the purpose described.

4. A locking mechanism comprising, in combination, a bolt which is divided longitudinally and vertically into two sections and formed with recesses two of which together constitute a slot when the sections are juxtaposed, a pivoted handle upon an arm of which the said bolt is slidably mounted, springs for loading the sections and normally projecting them from the handle, a quadrant formed with a series of notches with which the bolt is brought into register respectively in consequence of step-by-step movement of the handle, in either direction, and which the sections enter under the spring action to lock the handle in relation with the quadrant, means enabling the sections to be withdrawn from the notches against the spring action, a plunger housed in said handle and having a stem which is accommodated in the aforesaid slot, a spring for loading said plunger, a stop which is fitted on the plunger and free to slide axially on an extension of the latter so that it will seat in the appropriate recesses whenever the sections are withdrawn from a notch, a part on which the handle is mounted, said part being formed with cavities, pitched to correspond with the pitch of the notches for engagement by the plunger for the purpose of holding the handle prior to movement when the sections are withdrawn, and tripping the stop when the handle is moved so that in the action of changing from one notch to another the sections successively enter the notch to be engaged in order to lock the handle from movement in either direction.

5. A locking mechanism comprising, in combination, a bolt which is divided longitudinally and vertically into two sections, a pivoted handle upon an arm of which the said bolt is slidably mounted, springs for loading the sections and normally projecting them from the handle, a quadrant formed with a series of notches with which the bolt is brought into register respectively in consequence of step-by-step movement of the handle, in either direction, and which the sections enter under the spring action to lock the handle in relation with the quadrant, means enabling the sections to be withdrawn from the notches against the spring action, a spring-influenced plunger housed in the handle, a part on which the handle is mounted, said part being formed with cavities, pitched to correspond with the pitch of the notches for engagement by the plunger for the purpose of holding the handle prior to movement when the sections are withdrawn, detents associated with the sections suchwise as to rest thereon when they are projected and to move into engagement with the sections when the latter are retracted, thereby retaining them in that position, and cams on the quadrant for successively tripping the detents and releasing the sections upon movement of the handle between adjacent notches, whereby in the action of changing from one notch to another the sections successively enter the notch to be engaged in order to lock the handle from movement in either direction.

6. A locking mechanism comprising, in combination, a bolt which is divided longitudinally and vertically into two sections, a pivoted handle upon an arm of which the said bolt is slidably mounted, springs for loading the sections and normally projecting them from the handle, a quadrant formed with cam formations and a series of notches with which latter the bolt is brought into register respectively in consequence of step-by-step movement of the handle, in either direction, and which the sections enter under the spring action to lock the handle in relation with the quadrant, a grip which is pivoted on the handle, rods in pivotal connection with said grip, detents provided on said rods suchwise that in the normal position of the grip the detents are respectively positioned beyond the ends of the sections and the rods extend over the quadrant, whereby when the grip is operated the said rods and with them the detents, are moved lengthwise to enable the detents to retract the sections against the action of the springs but when the handle is moved laterally to carry the sections out of register with the initial notch towards another notch, the portions of the rods which still extend over the quadrant come into contact with the appropriate cam on the quadrant so that the detents are tripped thereby releasing the sections so that they will successively enter the notch to be engaged, for the purpose specified.

7. A locking mechanism, for the purpose described, in combination, parts movable one in relation to the other, a bolt divided into a plurality of co-adjacent sections associated with one of said parts, the other of said parts being formed with a plurality of complementary notches each of which is of a width corresponding to the combined thicknesses of the sections, means for withdrawing the sections from an engaged notch, means for holding the sections in the withdrawn position preparatory to engagement with another notch, and means for tripping the holding means during the action of changing from one notch to another, whereby, in the said action, the sections successively enter and fill the notch to be engaged thereby locking the parts against relative movement backwards or forwards.

8. A locking mechanism, for the purpose described, in combination, parts movable one in relation to the other, a bolt divided longitudinally into a plurality of contiguous sections associated with one of said parts, the other of said parts being formed with a plurality of complementary notches each of which is of a width corresponding to the combined thicknesses of the sections, means for withdrawing the sections from an engaged notch, means for holding the sections in the withdrawn position preparatory to engagement with another notch, and means for tripping the holding means during the action of changing from one notch to another, whereby, in the said action, the sections successively enter and fill the notch to be engaged thereby locking the parts against relative movement backwards or forwards.

9. A locking mechanism according to claim 7, wherein the ends of the bolt are oppositely bevelled so that in the course of transfer of the bolt from one notch to another and as the leading section of the bolt begins to overrun the edge of the notch to be engaged that section begins to enter the said notch and continues to do so until the whole of its width has overrun the said edge when the section will be free to enter the notch to the full extent of its permitted entry and when the following section of the bolt overruns the edge of the same notch it also will enter it thereby filling the notch and locking the mechanism against further relative movement.

10. A locking mechanism including, in combination, relatively movable parts, a sectional bolt associated with one of said parts, the other of which is formed with a plurality of complementary notches, spring means for action upon the sections of the said bolt, means for withdrawing the sections from an engaged notch and a stop and associated cam means for controlling said sections, the construction and arrangement being such that when the sections are withdrawn from a notch against the spring action they are held in this position by the stop, and in the action of changing from one notch to another the stop is tripped by the cam means to permit the sections successively to enter and thereby effect locking engagement with a desired notch, under the spring action, for the purpose described.

11. A locking mechanism including, in combination, relatively movable parts, a sectional bolt associated with one of said parts, the other of which is formed with a plurality of complementary notches, spring means for action upon the sections of the said bolt, means for withdrawing the sections from an engaged notch, detents for holding the said sections in the withdrawn position, and cam means for tripping the detents, the construction and arrangement being such that when the sections are withdrawn from a notch against the spring action they are held in this position by the detents, and in the action of changing from one notch to another the detents are tripped one after the other by the cam means to permit the sections successively to enter and thereby effect locking engagement with a desired notch, under the spring action, for the purpose described.

GUY BARRETT.